United States Patent
Benz

(10) Patent No.: US 9,689,279 B2
(45) Date of Patent: Jun. 27, 2017

(54) COGENERATION WITH NUCLEATE BOILING COOLED INTERNAL COMBUSTION ENGINE

(71) Applicant: Robert Benz, Modesto, CA (US)

(72) Inventor: Robert Benz, Modesto, CA (US)

( * ) Notice: Subject to any disclaimer, the term of this patent is extended or adjusted under 35 U.S.C. 154(b) by 174 days.

(21) Appl. No.: 14/121,148

(22) Filed: Aug. 6, 2014

(65) Prior Publication Data

US 2016/0040559 A1    Feb. 11, 2016

(51) Int. Cl.
- *F01K 23/10* (2006.01)
- *F01K 15/00* (2006.01)
- *F01K 25/08* (2006.01)
- *F22B 1/18* (2006.01)

(52) U.S. Cl.
CPC ............ *F01K 23/10* (2013.01); *F01K 15/00* (2013.01); *F01K 25/08* (2013.01); *F22B 1/1807* (2013.01); *Y02E 20/14* (2013.01); *Y02E 20/363* (2013.01)

(58) Field of Classification Search
CPC ............ F01P 11/20; F28F 27/00; F25D 17/02
USPC .................................................. 60/614–617
See application file for complete search history.

(56) References Cited

U.S. PATENT DOCUMENTS 5,255,636 A * 10/1993 Evans ................. F01P 3/02
123/41.29

2009/0288390 A1 * 11/2009 Pavia ................. F02K 9/972
60/267
2009/0293480 A1 * 12/2009 Harmon, Sr. ............ F01B 7/20
60/712

FOREIGN PATENT DOCUMENTS

WO    WO 2012150981 A2 *  11/2012

* cited by examiner

Primary Examiner — Mark A Laurenzi
Assistant Examiner — Shafiq Mian
(74) Attorney, Agent, or Firm — John R. Ross; John R. Ross, III

(57) ABSTRACT

A cogeneration system for generating electricity and process steam. The system includes an internal combustion engine having a shaft and a cooling system comprising a cooling fluid adapted to circulate through the engine and to cool the engine under conditions of nucleate boiling in which at least 10 percent of the coolant exits the engine in a vapor phase. It includes a vapor separator adapted to separate the coolant that exits the engine into a vapor phase coolant and a liquid phase coolant. The engine shaft drives an electric generator to provide electric power. A hot vapor line directs hot vapor exiting the vapor separator to a hot vapor process load. A coolant circulation pump is provided to force the cooling fluid through the engine, and a hot water line is provided to return hot water exiting the vapor separator to the coolant circulation pump. In preferred embodiments the system further includes an excess steam condenser for to collecting and condensing excess steam not needed by the hot vapor load, a condensate return tank adapted to store condensate from the hot vapor load and the excess steam condenser, and a condensate return line adapted to return condensate to the coolant recirculation pump.

16 Claims, 10 Drawing Sheets

COGENERATION WITH NUCLEATE BOILING COOLED INTERNAL COMBUSTION ENGINE

CROSS REFERENCE TO RELATED APPLICATIONS

This application claims the benefit of Provisional Patent Application Ser. No. 61/958,798, filed Aug. 6, 2013.

FIELD OF THE INVENTION

The present invention relates to internal combustion engines and in particular to such engines used for the generation of electricity.

BACKGROUND OF THE INVENTION

Reciprocating Engines

Reciprocating engines are desirable in cogeneration applications due to their high electrical efficiency. However the relatively low temperature of the heat generated as a byproduct of producing electricity is simply not hot enough to be useful, and hence the heat is wasted through a heat rejection system such as a cooling tower or radiator. In some applications, the heat may be useful for space or hot water heating, but may require an expensive hydronic or low-pressure steam system to distribute the heat to where it is needed.

Combustion temperatures of natural gas fired engines are substantially higher than the boiling points of the engine coolants (typically water, a water alcohol mixture or a commercial antifreeze product which may be a mixture of alcohol and ethylene glycol). So coolant boiling in the engines could lead to a condition of uncontrolled boiling in the coolant passages of the engines, especially in proximity of exhaust valves. This condition can drastically reduce the heat flux being carried away by the cooling system. This, in turn, can potentially produce a catastrophic effect on the internal metal parts of the engine. For this reason internal combustion engines are typically designed to be cooled with convective liquid cooling, mostly with water.

Nucleate Boiling

There is, however, a condition between normal liquid coolant flow conditions and uncontrolled boiling that provides an optimum heat flux from the parts to be cooled by the liquid cooling system. This is known as nucleate boiling in which bubbles are generated on a tiny or microscopic scale. This allows significant increases in heat flux, but this condition in many cases is a momentary transition between sub-boiling conditions and uncontrolled damaging.

Ebullient Cooling

Ebullient cooling of internal combustion engines has a long history and is a well-known, proven and increasingly practiced art. It has been utilized in some makes of large industrial and stationary engines to produce low-pressure steam as a cogenerated thermal product along with mechanical or electrical power and has been the subject of many patents. A 1983 Evans patent (U.S. Pat. No. 4,367,699) describes a boiling liquid cooling system for the engine of a passenger car. It cites no less than 49 related U.S. patents, five foreign patents and six publications dating back to 1911.

Ebullient cooling refers to the process of boiling a fluid in contact with the surfaces of a heated structure for the purpose of controlling its temperature to maintain structural integrity and/or to control heat losses. Ebullient cooling differs substantially from convective liquid cooling. The thermal capacity of the coolant is derived from its latent heat of vaporization rather than from its much lower sensible heat capacity. The consequent reduction in flow rates, pumping power and temperature changes makes it possible to produce nearly isothermal cooling with nearly uniform material temperatures and substantially reduced parasitic pumping power.

Almost without exception, modern liquid-cooled piston engines provide for coolant entry into the cylinder block and exit from the cylinder head. Coolant passage from the block to the head is typically internal to the engine via the head gasket and matching ports provided in the decks of the block and head castings. The occurrence of ebullient phenomena in the cooling systems of these conventional, typically upward-flowing, liquid-cooled engines operated under high output conditions is commonplace, although usually unintentional. It frequently occurs locally at high heat-flux points in the neighborhood of the engine combustion chamber where flow, temperature and pressure conditions may become unfavorable for the intended convective heat transfer. When it occurs under these conditions, it is usually considered to be adverse to engine durability by virtue of the development of cavitation erosion and hot-spots. Vapor bubbles formed locally on a superheated surface may subsequently condense as they are transported across cooler surfaces, resulting in minute but intense localized implosive shocks to the surface. Also depending on the flow, pressure and surface conditions prevailing at these superheated areas, vapor bubbles attached to the surface may grow to such a size that appreciable surface area is occluded from the circulating liquid, thereby defeating intended convective heat transfer. This condition, known as film boiling or departure from nucleate boiling (DNB), sharply reduces the local heat transfer rate which, for a given heat flux, requires large temperature differences. This cause or contribute to cooling-system failure.

Conventional ebullient cooling approaches rely on natural circulation of the coolant by the thermo-siphon effect. In this approach, the liquid coolant is introduced into the cylinder block and flows upward into the cylinder head and out of the engine. The coolant flow paths are almost identical to that which occurs in the conventional liquid-cooled engine and in many cases the fittings, gaskets and cooling systems are physically unchanged for ebullient operation. The main difference is in the method of coolant circulation. In the liquid-convective cooling system a coolant pump forces the circulation as determined by pressure, flow and geometrical considerations.

Some systems utilizing ebullient cooling may permit natural circulation of the coolant. Natural circulation ebullient cooling conditions are permitted by the lift and drag created by the vapor bubbles which form as heat transfer occurs. The large density difference between the bubbles and the liquid produces a strong buoyancy effect on the bubbles, and the relative motion of the bubbles in the confined liquid gives rise to the viscous drag that lifts the liquid upward and out of the engine as an entrained mixture with the vapor. When, external to the engine, the vapor is separated from the liquid and the density of the liquid is sufficiently great to cause the liquid to return to the engine block by gravity. A pump is required only to supply any make-up fluid required and/or to scavenge liquid from a remote condenser if used.

This approach, while practical for many applications, suffers from the same incipient film boiling and distribution problems mentioned in connection with conventional upward-flow liquid cooling. Because the gravity-motivated vapor lift type circulation is weak, coolant flow distribution in the critical high-flux zones about the cylinder head at the upper end of the flow path may be poor. Without internal control of this weak circulation, vapor/liquid distributions in the head where the heat flux is the greatest may be unfavorable for the heat transfer required.

Since the rate of bubble formation is greatest where the heat flux is highest, there is a tendency for the high-flux zones of a confined cooling jacket to be deprived of the liquid that provides the latent cooling effect. For this reason, some engine manufacturers de-rate their engines for ebullient-cooled operation. Since it supplies virtually all of the thermal capacity, the liquid must wet the surface to be cooled in order to obtain the full benefit of the ebullient cooling effect. This cannot be assured when the coolant flow path is from the low-flux to the high-flux zones of an engine, i.e. upward in a conventional automotive engine. Excessively large vapor bubbles and/or excessive vapor fractions sharply reduce the boiling heat transfer rate because of impaired liquid contact with the heated surface.

Jacketed engines are almost always designed to be cooled by the processes generally known as forced-convection heat transfer. The regimes of forced-convection heat transfer and the rates of heat transfer associated with these regimes are depicted qualitatively in FIG. 1. For a first approximation, velocity and temperature gradients are neglected in this presentation. In the ebullition regime, three forms of boiling may occur, each achieving widely different heat transfer rates. These are known as surface boiling, nucleate boiling and film boiling, listed in order of the level of heat-transfer-rate attainable.

Surface boiling, illustrated in FIG. 2A, achieves the highest rate of heat transfer known in the art. However, these high rates are obtained with little or no net vapor generation, since the phenomenon occurs largely in entrance regions when the bulk of the liquid phase is in a subcooled condition. Nucleate boiling occurs at the surface, but the small bubbles that form are quickly swept into the subcooled bulk where they condense back to liquid, giving up their latent heat of condensation to the bulk liquid. The high heat transfer rate attained in surface boiling is largely due to this latent transport mechanism and the vigorous mixing that accompanies it. This process is very useful for spot-cooling intensely heated areas but is difficult to implement throughout an engine jacket because of the narrow range of the bulk-fluid temperatures which sustain it. It is most useful when applied as an entrance region transient to be followed by a more general boiling technique. If heat recovery in the form of saturated vapor is desired, other more general forms of boiling, or ebullition, must be employed. It is also difficult to exploit usefully in conjunction with single-phase, forced conventional cooling, since it occurs, if at all, toward the exit regions of the jacket and, as indicated above, can quickly lead to film boiling with sharply reduced heat transfer and cooling system failure.

Nucleate boiling, illustrated in FIG. 2B, is the preferred mechanism for producing vapor simultaneous with high heat transfer rates at isothermal fluid conditions and minimal temperature gradients. Nucleate boiling can be established and maintained up to fairly high vapor/liquid ratios provided certain design constraints are observed. Representative heat-transfer coefficients in nucleate boiling of various fluids are given in FIG. 3, showing the effects of temperature difference and fluid pressure. Fluid velocity also has a significant effect (not shown), which can be used to enhance heat transfer. However, the viscous-pressure losses that accompany increased velocities reduce the vapor pressure and therefore the boiling temperature which, in turn, reduces the thermodynamic availability of the vapor generated. The upper terminals of the nucleate boiling curves of FIG. 3 indicate the approximate limits of nucleate boiling. Fluxes in excess of these limiting values result in a transition to the film boiling mechanism accompanied by sharply increased temperature differences required to compensate for the sharply reduced heat-transfer coefficients.

Heat transfer coefficients attained in nucleate boiling are at least an order of magnitude higher than forced convection liquid values at the same temperature difference. As a result, the use of the nucleate boiling mechanism in engine jackets can result in the over-cooling of certain engine parts, leading to excessive heat losses and reduced thermal performance. Thus, the successful application of the nucleate boiling method of engine cooling emphasizes temperature control rather than cooling per se in order to gain the full advantage of its high heat-transfer potential and characteristically low temperature gradients. With proper coolant distribution and flow control, a high degree of temperature uniformity at optimum temperature levels can be obtained in the engine structure. For comparison, the region of experience for forced convection, single-phase liquid heat-transfer attained in conventional engine-cooling jackets is also shown in FIG. 3.

The choice of working fluids and operating conditions for ebullient cooling of engines involves a number of material and thermodynamic considerations. These are listed in Table 1.

Since all of these factors are intrinsic to the fluid itself, its selection will require compromises and compensation in the determination of proper operating conditions. The magnitude of the latent heat of vaporization determines the coolant heat capacity in ebullient cooling. This in turn governs the coolant flow-rate schedule required to maintain a stable engine heat balance. The interfacial tension depends on the surface-wetting properties of the coolant. It determines the vapor bubble contact angle under boiling conditions which, in turn, determines the surface area effective in boiling heat-transfer (see FIG. 2).

TABLE 1

Latent Heat of Vaporization
Interfacial Tension with Engine Materials and Jacket Internal Surfaces
Vapor/Liquid Densities
Specific Heat
Thermal Conductivity
Viscosity: Liquid and Vapor
Vapor pressure
Corrosiveness, Solvent Power and Dielectric Properties
Critical Pressure/Temperature
Cost The ratio of vapor and liquid densities, together with the latent heat, determines the volume of liquid displaced by the vapor formed for a given rate of heat transfer. It also relates to the bubble size and rate of growth which, together with the surface tension, determines the loss of effective heat-transfer surface area tending to diminish the heat transfer coefficient. These fluid-related effects are strongly dependent on the critical pressure.

The critical pressure of a substance is the pressure required to liquefy a gas at its critical temperature. Maximum nucleate boiling heat-transfer coefficients for a given fluid are attained when the operating pressure is maintained at about one-third the critical pressure. Thus, there is an optimum operating pressure for heat transfer, but this may not be reconcilable with structural, material and system constraints, so that compromises may be required. Water, for example, has a critical pressure of 3,206.2 psia at a critical temperature of 705.4 F. Maximum boiling heat transfer rates can be obtained at pressures in the neighborhood of 1,070 psia and saturation temperatures of about 550 F. While these design conditions are acceptable—even desirable—for stationary power and marine propulsion boilers, they are excessive for existing reciprocating-engine cooling jackets.

Among the compromises that must be made to maintain nucleate boiling under lower-than-optimum pressure conditions is the degree of vaporization utilized in the high-flux zones of the jacket. This requires that an excess of liquid be pumped over and above that which would provide the minimum latent heat capacity for heat transfer, the excess being required to compensate for excessive vapor displacement. In low-pressure and natural circulation evaporators, this is known as flooding. In forced-circulation, once-through boilers or engine jackets this excess liquid is referred to as transport flux.

A variety of alcohol, hydrocarbon and halocarbon materials having somewhat lower critical pressures than water are available. Some of these materials will operate in engine jackets at nearly optimum pressure levels for heat transfer and have other properties providing advantages in some applications.

What is needed in the art therefore is a cooling system which effectively maintains nucleate boiling in an engine cooling system to maximize heat removed from the engine combustion chamber while providing much higher temperatures in the coolant discharged from the cooling system.

SUMMARY OF THE INVENTION

The present invention provides a cogeneration system for generating electricity and process steam. The system includes an internal combustion engine having a shaft and a cooling system comprising a cooling fluid adapted to circulate through the engine and to cool the engine under conditions of nucleate boiling in which at least 10 percent of the coolant exits the engine in a vapor phase. It includes a vapor separator adapted to separate the coolant that exits the engine into a vapor phase coolant and a liquid phase coolant. The engine shaft drives an electric generator to provide electric power. A hot vapor line directs hot vapor exiting the vapor separator to a hot vapor process load. A coolant circulation pump is provided to force the cooling fluid through the engine, and a hot water line is provided to return hot water exiting the vapor separator to the coolant circulation pump.

In preferred embodiments the system further includes an excess steam condenser for to collecting and condensing excess steam not needed by the hot vapor load, a condensate return tank adapted to store condensate from the hot vapor load and the excess steam condenser, and a condensate return line adapted to return condensate to the coolant recirculation pump. In preferred embodiment the system further includes a computer driven control system and temperature and flow meter components to permit automatic control of the system to maintain a desired degree of nucleate boiling in the engine. In preferred embodiments the coolant exiting the engine is saturated with a quality of between 2 and 30 percent. A wide variety of cooling fluids can be used. Typically they will be at least 90 percent water, but in special cases cooling fluids that are not water based may be preferred.

The hot vapor of the present invention can be advantageously utilized in a great variety of processes including many industrial, commercial and residential processes including space heating. The electrical output can provide a base load or be used to supply peaking power.

In preferred embodiments of the present invention the temperature of lower quality vapor generated in an engine jacket is increased by an exhaust to coolant heat exchanger, after which vapor is separated from saturated liquid for use in various industrial or commercial processes. In other words, it is desired to extract the engine jacket heat as dry vapor. It is a principal object of the present invention, therefore, to provide an improved boiling liquid cooling system for an internal combustion engine in which the heat transfer is accomplished by nucleate boiling maintained by the pressure drop across cooling jets. Preferred embodiments of the present invention provides an improved boiling liquid cooling system for an internal combustion engine in which a series of liquid nozzles are positioned to impinge areas of highest heat flux with cooling liquid at or its near saturation pressure with velocity sufficient to maintain nucleate boiling conditions while preventing film boiler through a constant predetermined pressure drop between the nozzle entrance and exit under all engine operating conditions. These and other objects of the invention are also achieved in a boiling liquid, cooling system for an internal combustion engine including a coolant inlet and coolant outlet, the cooling system including a separation tank coupled to the coolant inlet and coolant outlet for separating vaporized coolant from liquid coolant, a makeup system coupled to the separation tank for replacing the vaporized coolant flowing from the separation tank to an external heat sink.

In one embodiment of the invention, the coolant is boiler feedwater and the vaporized engine coolant supplements steam needed of feedwater deareator. Saturated liquid from a deareator is fed from a feedwater pump through a control valve to maintain a predetermined pressure drop across the engine coolant nozzles. Low quality steam from the internal combustion engine is then returned to the dearator. In another embodiment of the invention, the coolant is water and the vaporized coolant from the engine provides steam for a laundry or other commercial or industrial process requiring low pressure steam.

Another embodiment of the invention, involves the induction of vapor in the form of steam produced in the engine jacket into the air intake of the engine for the purpose of controlling oxides of nitrogen emissions. It is well known that the generation of nitrogen oxide is reduced by adding water in the combustion process of an internal combustion engine. This is due to the cooling effect by the added water. Actually, water injection to a reciprocating engine has been done by two different methods, i.e. direct injection of water into the combustion chamber, or introduction of water into the combustion chamber by way of intake air passage. Water injection adversely affects engine efficiency as the phase change requires substantial energy which reduces the force of the engine expansion stroke. The use of steam generated in the engine jacket for induction into the air inlet of the reciprocating engine reduces nitrogen oxide emisions without the reduction in engine efficiency.

The foregoing objects of the invention are also achieved in a boiling liquid coolant system for an internal combustion engine having a cylinder block with at least one cylinder, a cylinder head, at least one inlet per cylinder, each coolant inlet comprising a jet or series of jets for directing high velocity coolant to impinge on areas of high heat flux arranged so to maintain nucleate boiling conditions on the engine heat transfer surfaces.

The objects of the inventions maintain stable nucleate-boiling heat-transfer conditions having the following attributes:

- Radically reduced coolant flow-rates and parasitic pumping power.
- Extremely short engine-warm-up transients.
- Orderly coolant behavior over a wide range of operating conditions including shutdown.
- Excellent engine structural temperature control featuring good temperature uniformity in high-heat-flux zones during engine operation from idle to maximum continuous power and also upon sudden shutdown.
- Reduced combustion-chamber and piston heat losses without compromise to material structural margins, seal integrity, knock-limited torque development, or fuel economy.
- Brake mean effective pressures approaching 300 PSI with brake specific fuel consumptions below 0.48 Lbs per HP-Hr.

The foregoing and other additional objects, features, and advantages of the present invention are more fully described in the following detailed description.

DETAILED DESCRIPTION OF PREFERRED EMBODIMENTS

Figure 1:
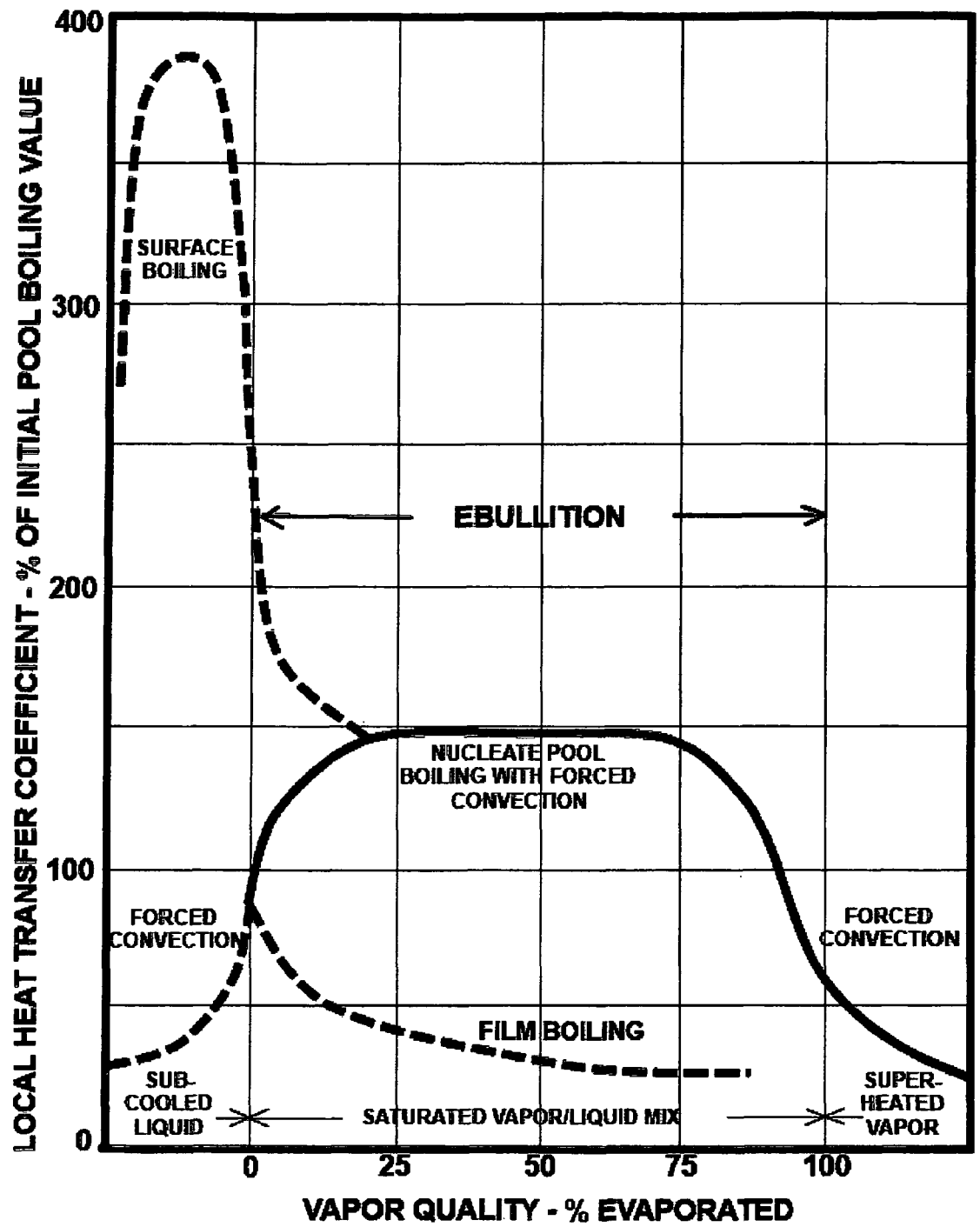
FIG. 1 depicts regimes of forced-convection heat transfer and rates of heat transfer associated with these regimes.
Figure 2:
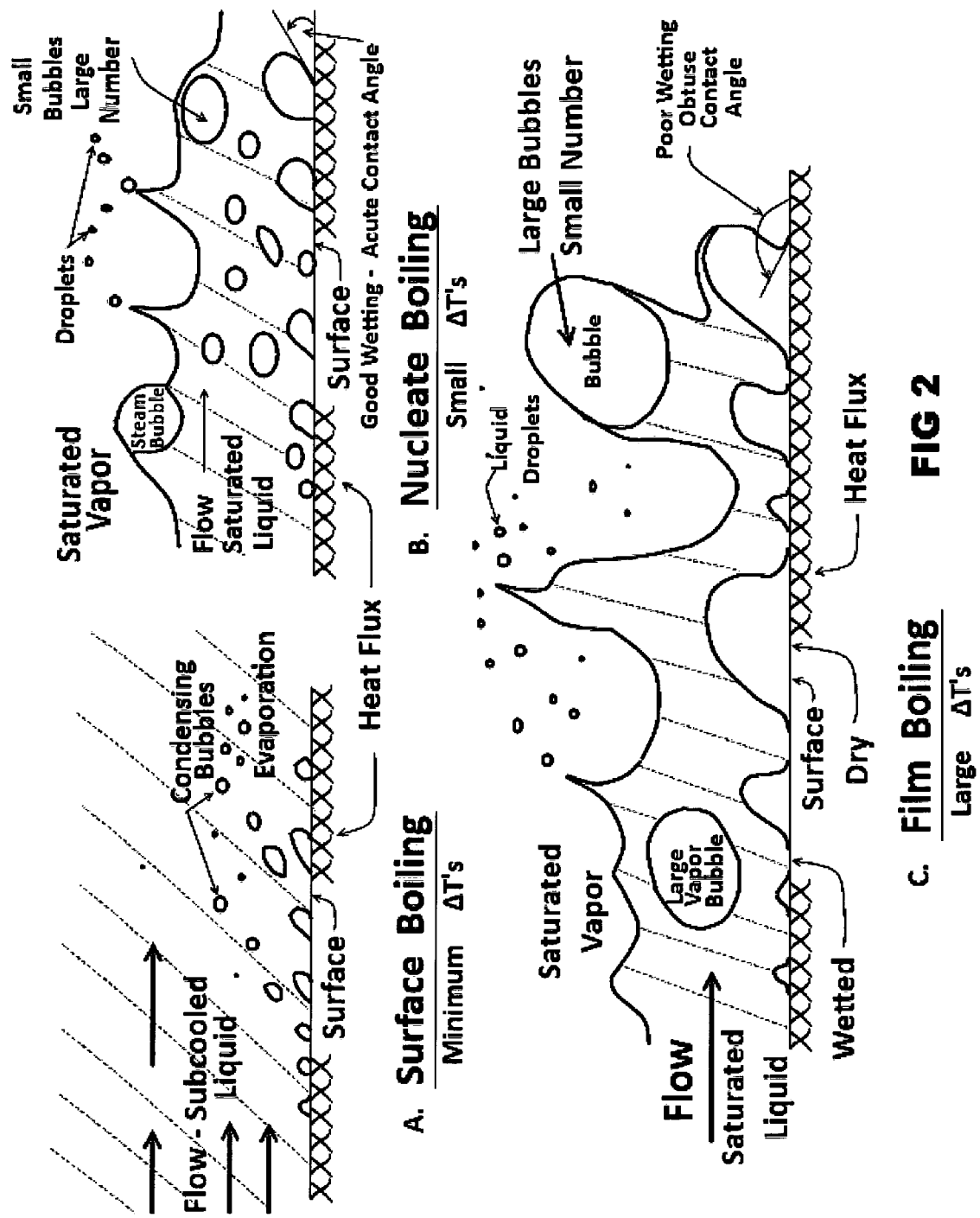
FIG. 2 is a graphic description of surface boiling, nucleate boiling and film boiling.
Figure 3:
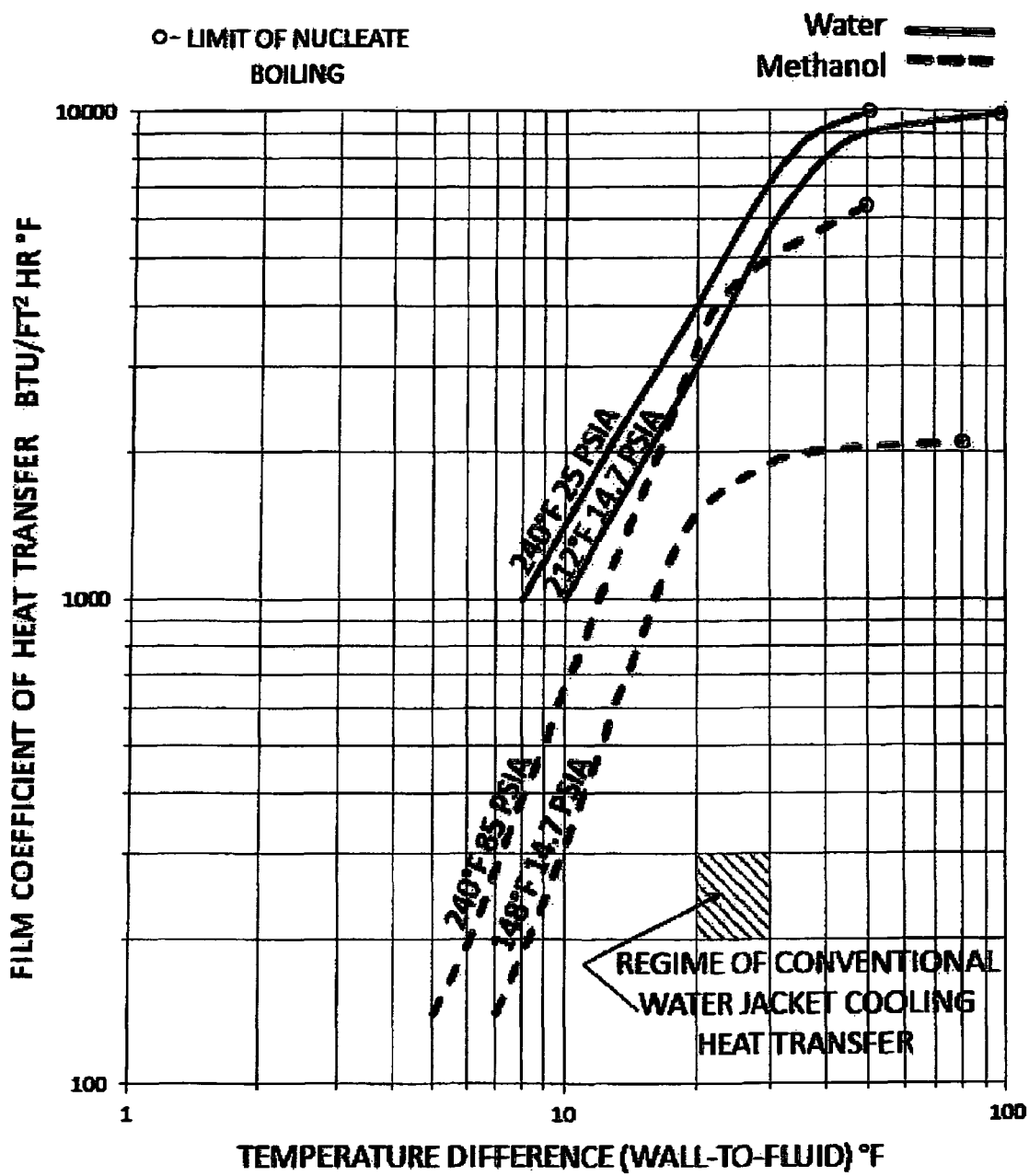
FIG. 3 shows the regime of conventional water jacket cooling heat transfer.\
Figure 4:
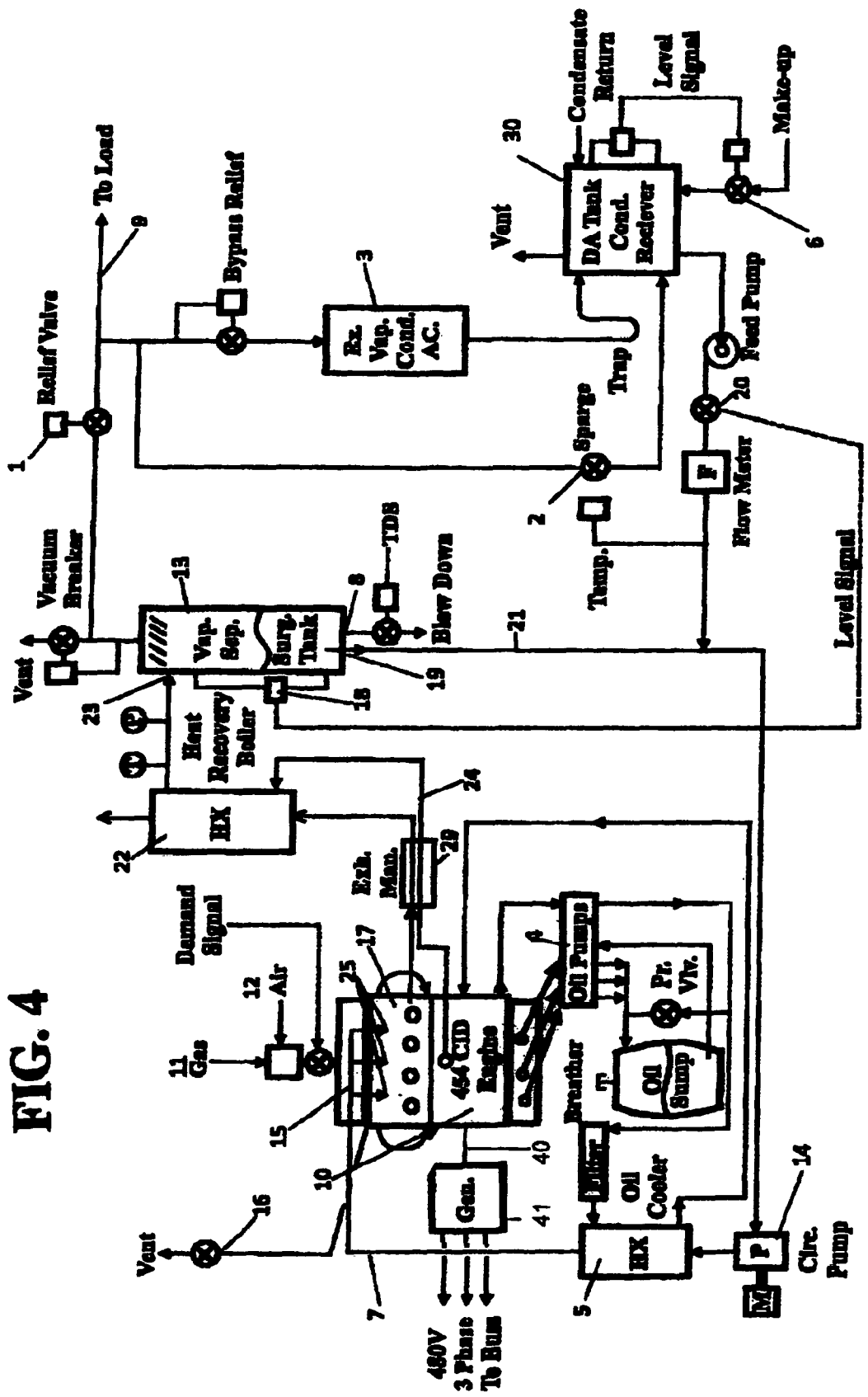
FIG. 4 is a general layout of a preferred embodiment of the present invention.

The design of a specific embodiment of the present invention is represented in FIG. 4 and in Tables 2 and 3. The system features an ebulliently-cooled, production-type, spark-ignition automotive engine fueled by natural gas driving a state-of-the-art induction generator and managed by a state-of-the-art microprocessor-type process automation system.

A prototype embodiment has been built and tested by Applicant. For it he utilized a General Motors V-8 engine with a displacement of 454 cubic inches. The specific engine parts are in general those of this engine. In the prototype Applicant's coolant was water. FIG. 4 shows a boiling liquid cooling system based on Applicant's prototype. The internal combustion engine 10 includes an oil pump 4, an oil cooler 5, a vapor separation tank 13, a circulation pump 14. These components are arranged in a circuit, the discharge of the circulation pump 14, flowing counter flow through an engine oil cooler 5, wherein engine oil pumped by the engine oil pump 4 is cooled and reintroduced to the engine 10, the coolant discharge from the engine oil cooler 5 feeds coolant injection nozzles 25, arranged so to impinge high heat flux areas within the engine cylinder head 17 (shown in FIG. 5) with high velocity coolant. Engine shaft 40 drives electric generator 41 to provide electric power.

TABLE 2

FEATURED CHARACTERISTICS

Compact, Light-Weight, Small-Foot-Print Package Plant Based on Use of High Specific Power Prime Mover.
Reduction in Cost Based on Use of Production Automotive Engine Subject to Large-Scale Manufacturing Economies.
High Thermal Efficiency Maintained Under Widely Variable Electric/Thermal Load Ratios Using Thermal-Load-Matching Automation to Conserve Fuel, Minimize Excess Steam Production and Minimize Start-Stop Cycles which Adversely Affect System Reliability and Engine Durability.
Improved Efficiencies Available with Concurrent Hierarchical Thermal Outputs, e.g. Hot Water, Low-Pressure Steam, High-Pressure Steam, Hot Gas, etc.: High Efficiency Both Qualitatively and Quantitatively.
Improved Durability/Rating/Flexibility Trade-Offs With Dual Speed Options, e.g. 1,800 rpm for Continuous Base Loads, 3,600 rpm for Periodic Peak Loads.
Improved Durability, Shaft Rating and thermal Performance with Forced-Downflow Ebullient Engine Cooling.

Figure 5:
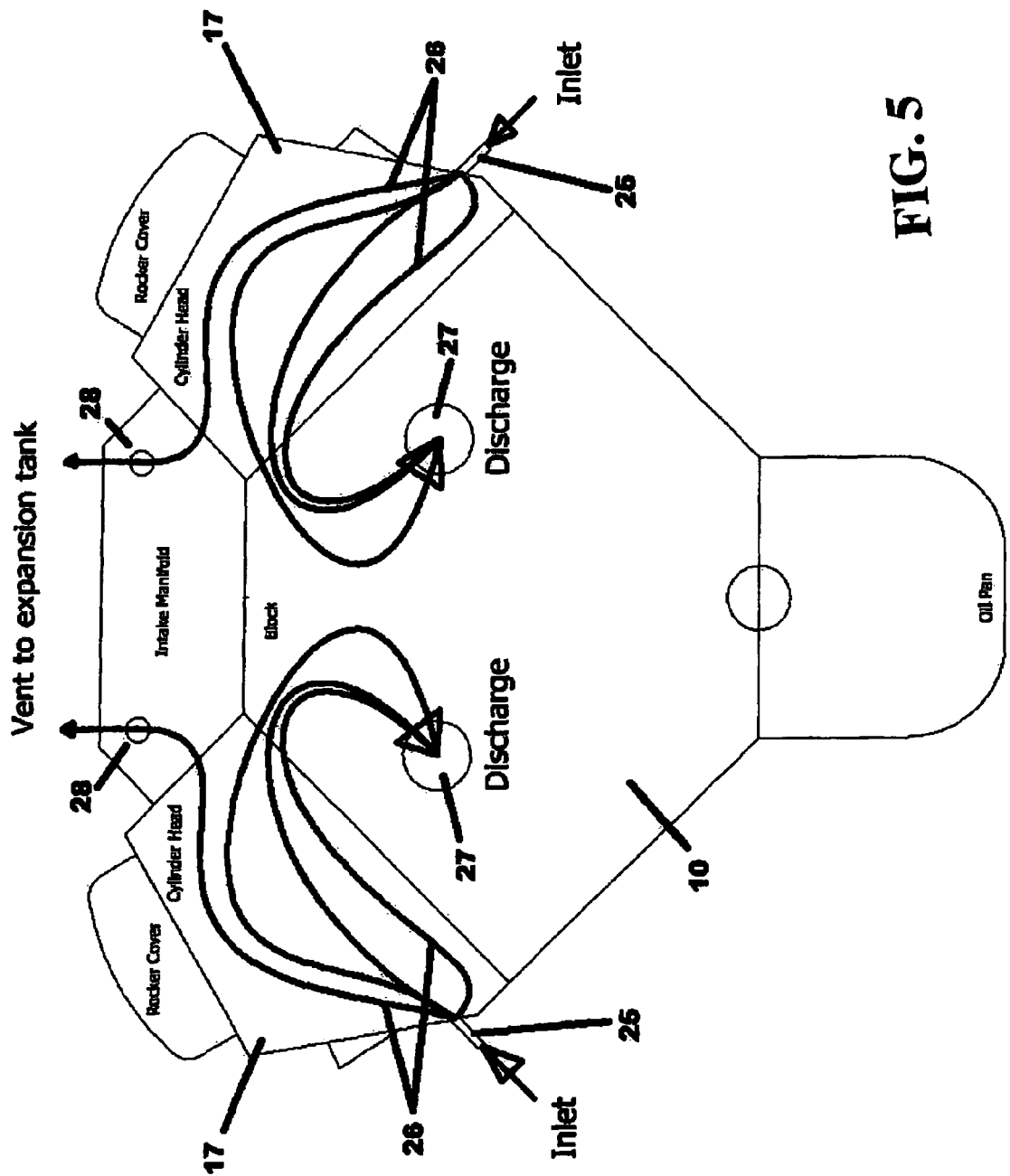
FIGS. 5, 6 and 7 show a technique for cooling a standard V-8 engine head and block.
Figure 6:
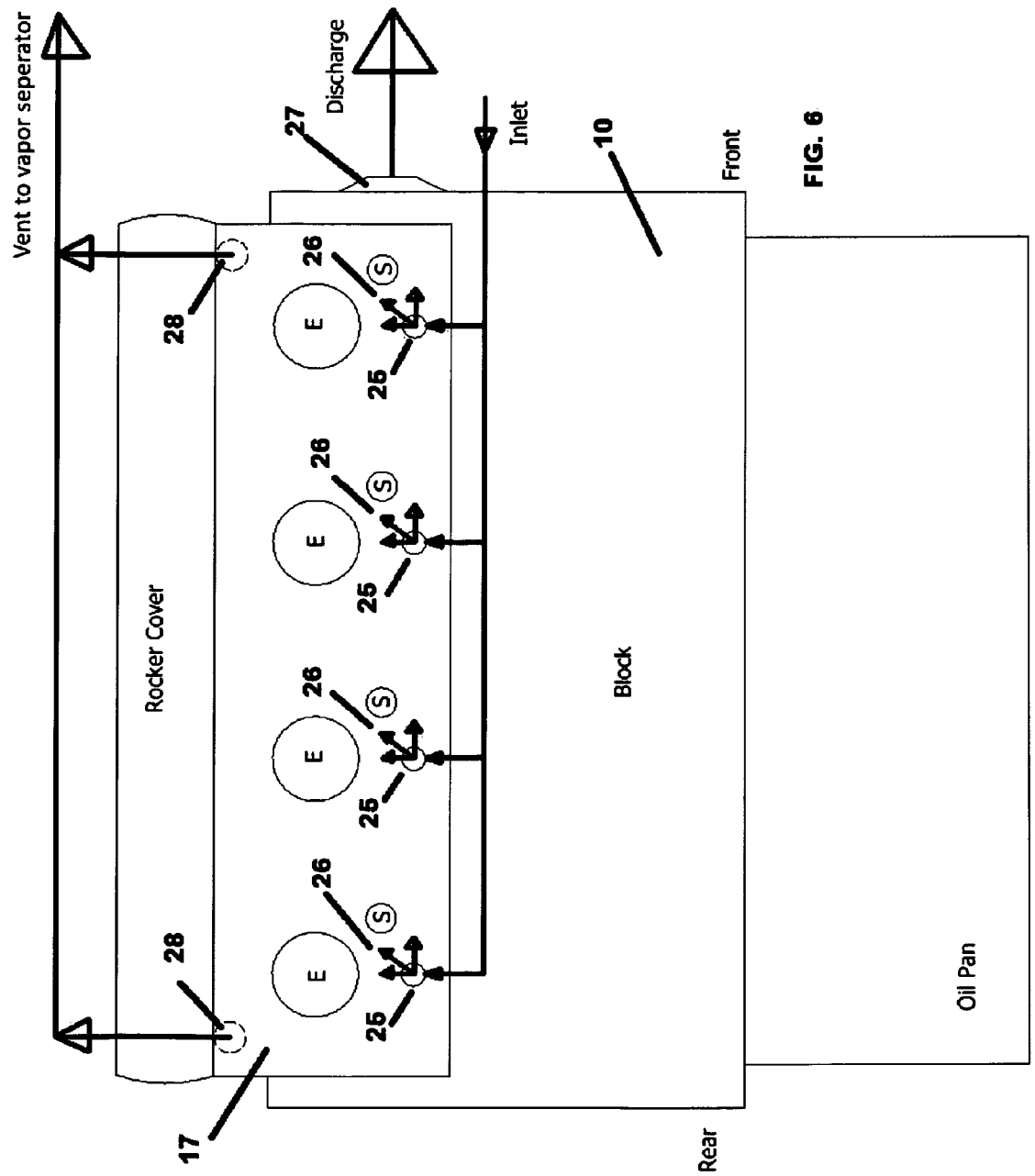

Coolant flows across the interior of the engine cylinder head 17 down through selected passages between the head and engine block, flowing as partial quality saturated vapor out of the engine block 10 as shown at 27 in FIGS. 5 and 6. The partial quality saturated vapor is collected in a discharge header feeding a coolant line to the vapor separator 13. Vapor is fed from the vapor separator to a hot vapor distribution line 9 as shown in FIG. 4 to feed a hot vapor load (referred to as "load" in FIG. 4). The level of the vapor separator 13 is maintained by a level controller (not shown) which actuates a feed valve 20 based on a predetermined set-point coolant level measured by a level transmitter 18. Coolant and make up coolant in the vapor separator are fed to the circulation pump 14 thus completing the circuit.

Separation tank 13 as shown in FIG. 4 has one inlet and two outlets. A liquid coolant outlet 19 at or near the bottom of the tank connects through a conduit such as a hose 21 to the circulation pump and then the oil heat exchanger, lastly entering the engine through the coolant nozzles 25. The second liquid coolant outlet 8 is located at the bottom of the tank 13 as a blow down. A vapor inlet 23 in the side of tank 13 receives a mixture of hot coolant liquid vapor delivered through a conduit such as hose 24 from a discharge 27 at the front of the engine; then running through the jacketed exhaust manifolds 29 and exhaust heat recovery boiler 22, thus completing the engine coolant circuit.

Condensate from the hot vapor load is returned to a condensate receiver tank 30 as shown in FIG. 4. In addition the preferred embodiment includes a bypass valve and an air cooled excess vapor condensate tank 3 adapted to condense hot vapor not needed by the hot vapor load. Condensate from these two components is pumped by a feed pump shown in FIG. 4 through a flow meter to recirculation pump 14. Make up cooling fluid is provided through makeup valve 6 which preferably is automatically controlled to maintain a desire level of coolant fluid in the system.

Figure 7:
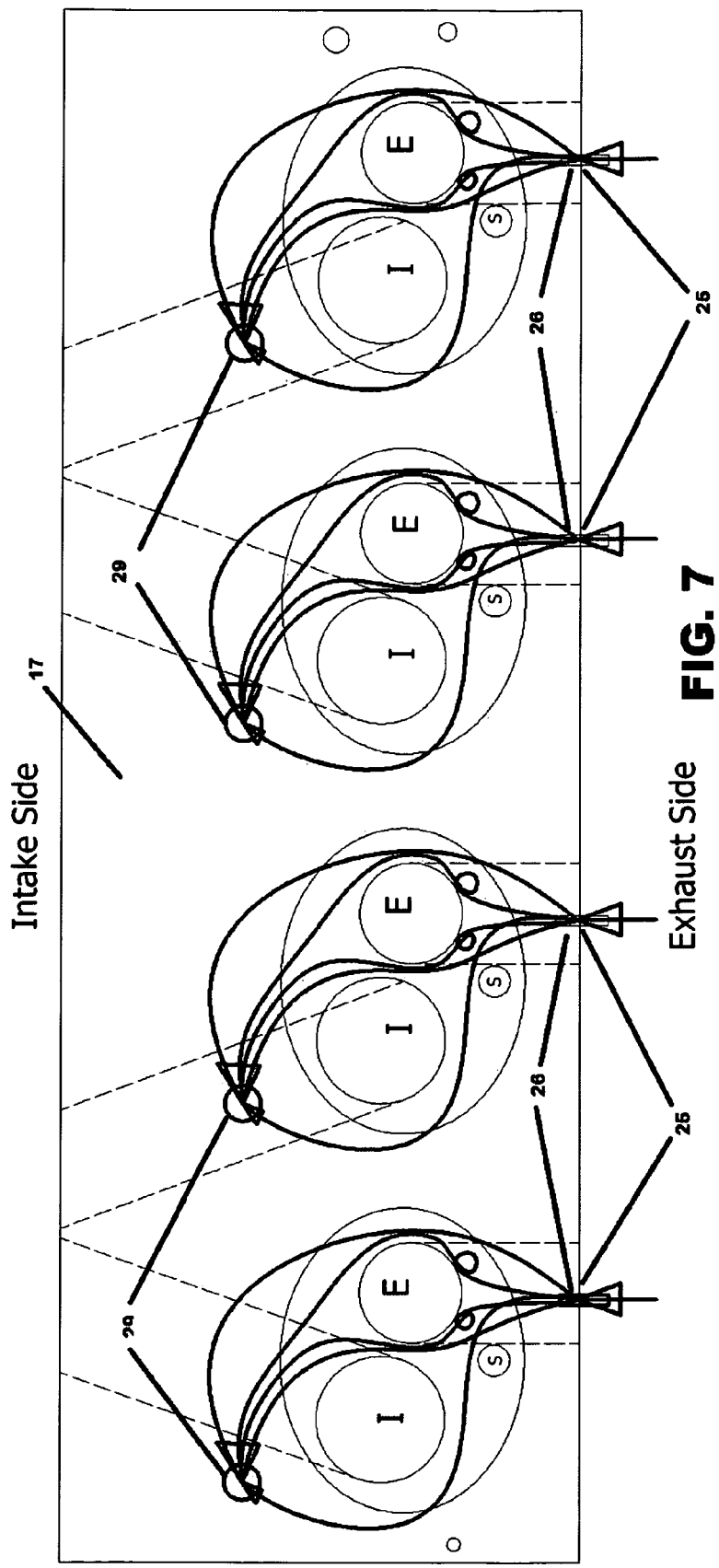

FIGS. 5 and 6 show the side and front of the standard V-8 engine head 17 and engine block 10 and FIG. 7 depicting a head 17, four coolant entrance ports are drilled and tapped into the side of head 17, with threading to mate to the coolant supply nozzles 25. The coolant supply nozzles 25, are arranged to provide specific directional flow 26 of high velocity coolant for impinging the high heat flux surfaces inside the engine head, the direction typically arranged in a series of jets which are fixed to a conduit supplying coolant at constant pressure for maintaining constant velocity.

FIG. 5 shows a cross sectional circulation pattern of flow to maintain nucleate boiling conditions throughout the engine, the head gasket sealing the interface between the head 17, and the engine block 10, is provided so that coolant port openings between the head 17 and engine block 10 are sealed with the exception of a head exit ports located opposite the coolant entrance ports 25, creating a passage for partially saturated liquid coolant flowing across the head and into the engine block 10. The coolant passing into the block flow transverse out of the engine block through coolant exit ports 27, originally reserved for a water pump of a conventional engine. In order to remove any entrained air in the saturated liquid, engine coolant vents 28 are provided at the end of the intake manifold which communicate with the engine coolant passages.

TABLE 3

EBULLIENT-COOLING SYSTEM

1. REVERSED-FLOW PATH
    a. Aggressive surface impingement and boiling at high-flux zones
    b. Stable nucleate boiling with once-through, forced-flow zones
    c. Excess liquid circulation with external vapor separation
    d. Cross-flow in head from exhaust to intake side
    e. Cross-flow in block from ends to center
    f. External head-to-block connection
    g. Head vent to standpipe
2. JET-INDUCED CENTRIFUGAL CIRCULATION PUMP
    a. Electrically driven, constant head and flow
    b. Low power consumption
    c. Pulsation isolated from boiler
3. MINIMUM TEMPERATURE CONTROL
    a. Back-pressure override on vapor delivery pressure
    b. Accelerated warm-up
    c. Stand-by oil heater, thermostat-controlled TABLE 3-continued

EBULLIENT-COOLING SYSTEM

4. MAXIMUM TEMPERATURE CONTROL
    a. Automated load management
    b. Pressure-relief dump to waste-vapor condenser
    c. External oil cooler, thermostat-controlled
    d. Under piston cooled oil impingement In this down-flow forced-circulation arrangement, feed coolant enters the exhaust side of the heads 17, as shown at 25, transits the exterior of the combustion-chamber roofs in a cross-flow direction 26, exits the heads and enters the cylinder block along the intake side as shown at 29 in FIG. 7, cross-flows the cylinders and exits the block at the center on each side 27. The flow rates, pressures and temperatures are managed such that, together with the prevailing heat-flux distributions, nucleate boiling occurs at the heated surfaces contacted by the coolant. The fluid temperature remains virtually constant throughout the jacket, with the vapor fraction and velocity increasing progressively from inlet to outlet.

FIG. 7 shows a cross-section of the head at one combustion chamber and the location of the coolant-entry port, the twin-jet orifice producing liquid impingement at the spark-plug boss and exhaust-valve seat boss. In this design, the total coolant flow to the engine is represented by 64 units of coolant, 32 units in each side of the engine jacket. Each head-inlet nozzle 25 (one for each cylinder, four in each head) receives eight flow units, which it delivers into the head jacket via the twin jets, one axial and one radial. Six units of flow are directed-axially at the valve boss with a velocity of 49 feet-per-second. This velocity is produced with a pressure difference across the orifices of approximately 19 psi. Two units of flow at the same velocity are directed radially at the spark-plug boss. The total inlet flow (sub-cooled liquid) handled by the eight inlet fittings is approximately 9.918 cubic feet per second. The axial orifice is approximately 7/64 ths of an inch in diameter, and the radial orifice is approximately 1/16 th of an inch in diameter.

The fluid leaving the heads and entering the block is approximately 10% vapor by mass, having a total volume flow of approximately 2.92 cubic feet per second. In this representative design, five matching ports provided in the decks of the heads and block, allow the fluid to pass into the block and circulate there through. Special cylinder-head gaskets are used to prevent flow except at these five ports in each deck (ten in all), which are sized for approximately 100 feet-per-second velocity at a pressure difference of about 9.5 psi. This pressure drop results in a temperature reduction of about one-degree F. Deflector vanes installed in each block-side port can be used to enhance the cross-flow distribution in favor of the top-end of the cylinder. The special cylinder-head gaskets differ from stock gaskets only in the number and size of coolant ports punched.

Figure 8:
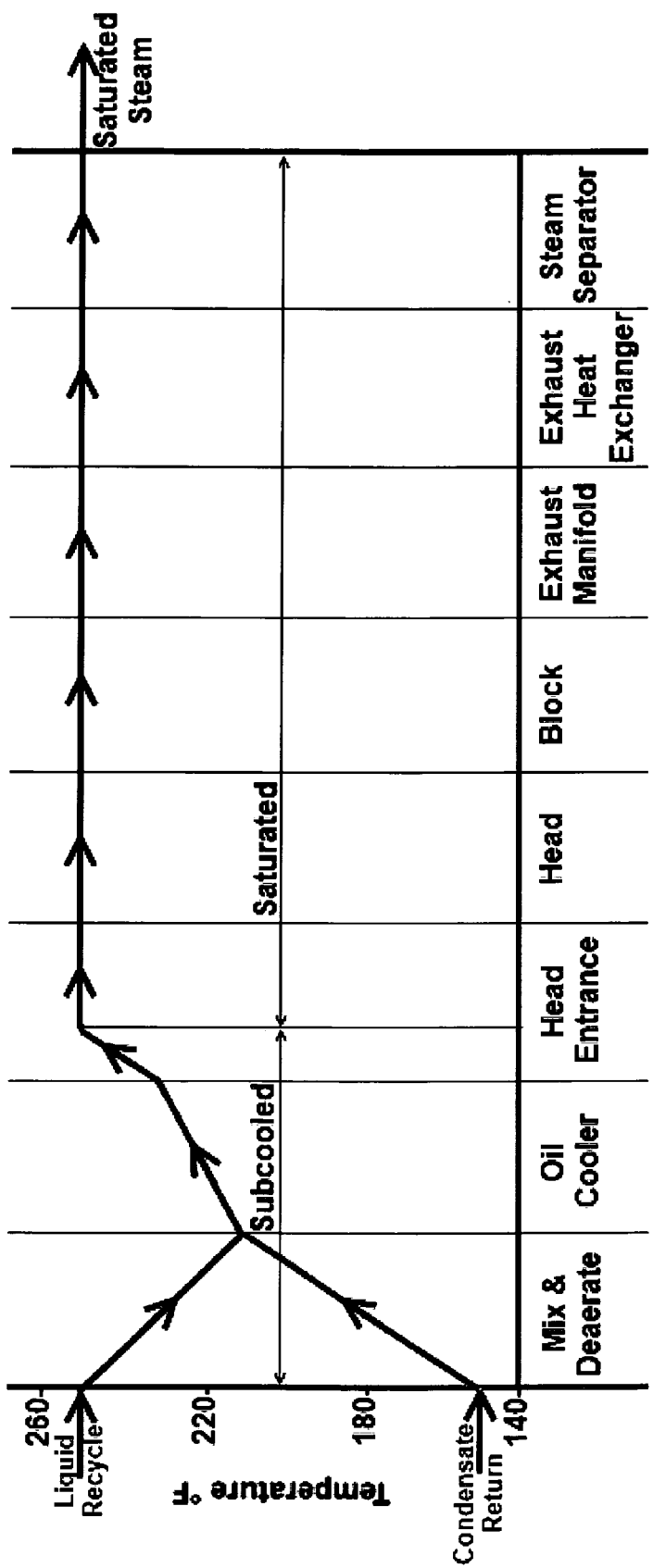
FIG. 8 shows an approximate temperature of the components of the V-8 engine utilizing embodiments of the present invention.

Following a short, single-phase entrance region, the vapor fraction increases progressively as the fluid transits the engine jacket. This process is illustrated in FIG. 8, showing representative heat transfer, vapor fraction and temperature distributions throughout the system.

The vapor quality leaving the engine jacket is a relatively low 15%. This results from using high liquid transport fluxes to maintain the most favorable conditions for nucleate boiling with liquid at low pressures. Subsequent to the engine jacket, the two-phase fluid is passed through an exhaust-heat recovery boiler and then to the vapor separator where the vapor and liquid phases are separated. The saturated vapor is then piped to the heat load, and the saturated liquid is circulated to the engine via the separately driven (electric) centrifugal pump, aided by a variable-area jet inducer (eductor).

For variable load and speed applications, the feed pump and eductor are automated as an energy conservation measure. The pump speed is modulated to schedule its output as a function of the fluid vapor fraction entering the vapor separator. This is accomplished by a state-of-the-art, signal-following induction-motor control that modulates the pump speed to maintain a given ratio of recirculated flow-to-feed flow as measured by appropriately placed flow meters and calculated by the microprocessor. The eductor primary nozzle area is modulated by a state-of-the-art position control which maintains a given primary-flow-to-total-flow ratio as the pump output varies, so that adequate flow rate through the engine maintains nucleate boiling.

Figure 9:
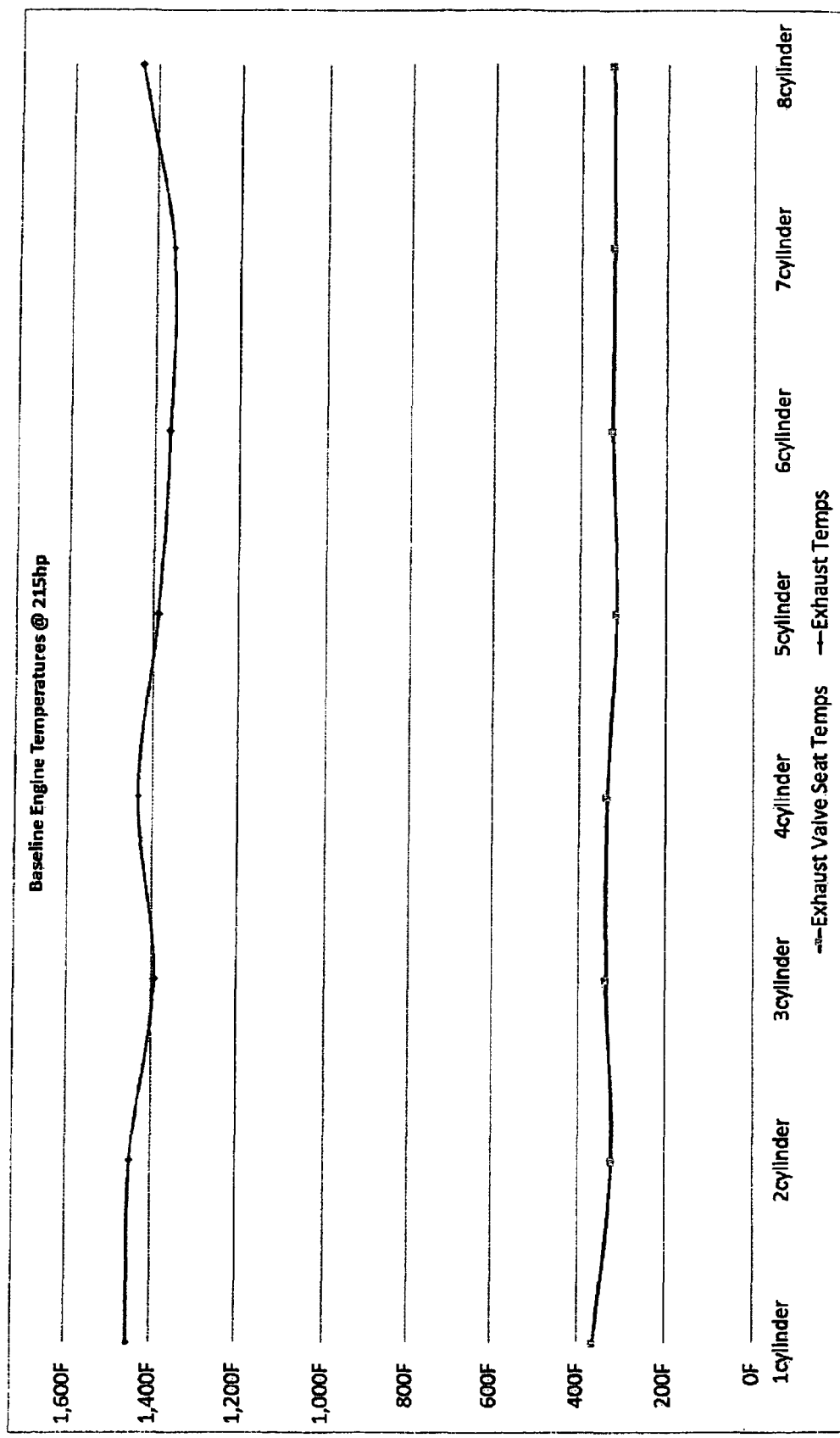
FIG. 9 is the experimental data of valve seat metal and exhaust gas temperatures distribution of a conventionally cooled 454cid V-8 engine operating at wide open throttle at 3600 rpm.
Figure 10:
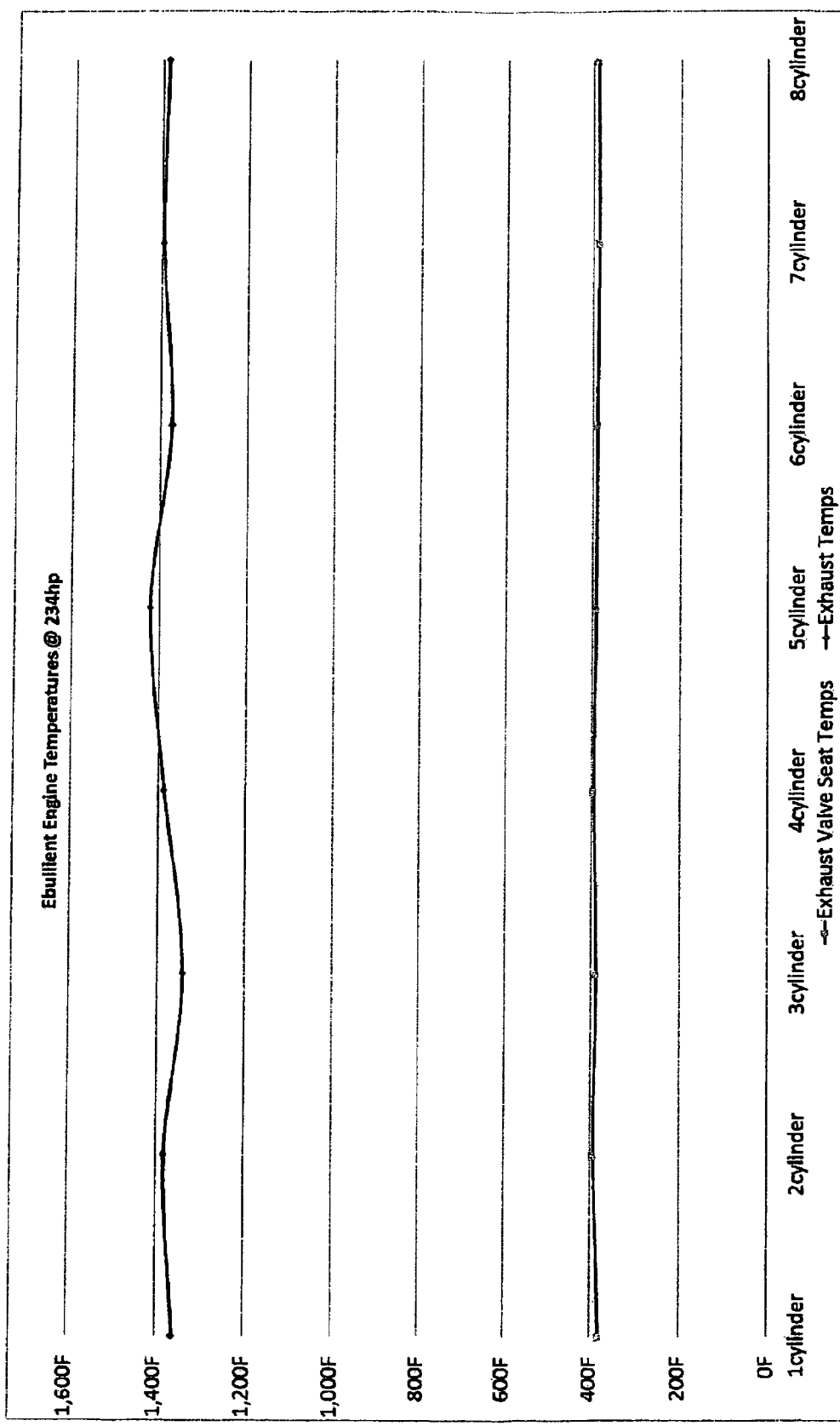
FIG. 10 is the experimental data of valve seat metal and exhaust gas temperatures distribution of a 454cid V-8 engine modified for ebullient cooling operating at wide open throttle at 3600 rpm.

The proof-of-concept of the invention consisted of an experimental evaluation of the effects of the nucleate cooling scheme disclosed on a back to back basis with the same engine prior to the nucleate cooling modification. The approach capitalized on the relative ease of retrofitting the novel ebullient cooling system to the conventional engine to facilitate such back-to-back testing. A Chevrolet V-8 engine with 454 cubic inch displacement was prepared for natural gas service. The engine was instrumented with temperature probes to measure head metal temperature near the exhaust ports. The engine was connected to a variable speed dynamometer and run at wide open throttle at 3600 and 1800 rpm. The first run of the back-to-back test was with the stock engine as conventionally cooled with 30 gallons per minute of 125° F. water entering the engine block, exiting the engine from the intake manifold. FIG. 9 is the valve seat and exhaust gas temperatures resulting from the first run. The second run was with the same engine modified for nucleate cooling with 12 gallons per minute of 240° F. water entering the engine head through 8 separate jets and existing the engine block at 255° F. saturated temperature and pressure. FIG. 10 represents the valve seat and exhaust temperature distribution of the same engine modified for ebullient cooling.

The valve seat temperature distribution of the ebullient cooled engine was within 20° F. of the same engine conventionally cooled although the cooling water supply for the ebullient cooled engine was 115° F. higher than the conventionally cooled engine. Engine performance was found to be equal or better with the ebullient cooling scheme compared to conventional cooling, the ebullient cooled variation yielding higher power output at the same rpm and using the same amount of fuel input.

Applicant has built and tested prototype versions of his invention as described above and the prototype described above provides the following features representing important technical advances in the prior art:

Engine boiling is universally known to be unacceptable requiring immediate engine shutdown and precluding improved performance resulting from nucleate boiling in internal combustion engines.

Exceptional heat transfer and temperature control.

Surface and nucleate boiling—high heat transfer rates, small temperature gradients.

Temperature uniformity in coolant and engine structure, permitting improved engine performance and durability.

Heat-transfer rate inherently matched to heat-flux distribution.

Temperature control—maximum and minimum with short warm-up and starting transients.

Latent cooling capacity less dependent on flow rates and velocities.

Reduced parasitic pumping power by virtue of latent heat capacity.

Reduced life-cycle cost by virtue of automotive-technology adaptation.

Reduced application complexity by virtue of compact size and light weight.

Increased application flexibility with two-speed operation arid load-matching controls.

Increased application potential by virtue of the hierarchy of thermal outputs and dual ratings (baseload and peaking).

Reduced nitrogen oxide emissions from the induction of vapor in the form of steam generated in the engine jacket into the air inlet.

Utility

The usefulness of the method is found in terms of the following factors:

Reduced capital cost by virtue of the retrofit utilization of automotive engines.

Improved performance, efficiency and durability with rapid pay-back potential.

Steam cogeneration with high electric and thermal availability and high electric and thermal efficiencies.

Both base-load and peak-shaving modes of service can be utilized, maximizing payback potential.

Thermal outputs suited to a variety of commercial, industrial and domestic utility-service applications can be provided. Hot fluid byproduct of electric generation has substantially increased usefulness as compared to hot water from prior art systems.

Increased availability of heat from engine by virtue of constant temperature latent heat exchange.

FIGURE NOMENCLATURES

1. Pressure relief valve
2. Sparge for makeup preheating
3. Air cooled vapor condenser for bypass
4. Oil pump
5. Oil Cooler
6. Makeup
7. Hot coolant supply
8. Blow Down Outlet
9. Dry Vapor line
10. Engine Block
11. Gas supply
12. Air supply
13. Vapor separator
14. Circulation pump
15. Engine cooling distribution header
16. Crank case vent
17. Engine Head
18. Level transmitter
19. Tank outlet to circulation pump
20. Feed Valve
21. Return line from separater
22. Exhaust heat recovery boiler
23. Vapor separation tank inlet
24. Engine coolant discharge header
25. Coolant entrance nozzle
26. Coolant supply flow pattern
27. Coolant exit ports
28. Engine Coolant vents 29. Head exit ports
30. Deareator and condensate return tank.

Variations

Preferred embodiments of the present invention have been describe in detail above but these embodiments are not to limit the present invention. Persons skilled in this are will recognize that there are many obvious additions and modifications that can be made to the versions of the present invention as specifically described above. Therefore, the scope of the invention are to be determined by the appended claims and not by the specific embodiments described above.

What is claimed is:

1. A cogeneration system for generating electricity and process steam comprising:
    A) an internal combustion engine having an engine block, at least one engine head, a shaft and a cooling system comprising a cooling fluid adapted to circulate through the engine and to cool the engine under conditions of nucleate boiling in which a portion of the cooling fluid exits the engine in a vapor phase,
    B) a vapor separator adapted to separate the coolant that exits the engine into a vapor phase coolant and a liquid phase coolant,
    C) an electric generator, driven by the engine shaft, for generating electricity,
    D) a hot vapor line adapted to direct hot vapor exiting the vapor separator to a hot vapor load,
    E) a coolant circulation pump adapted to force the cooling fluid through the engine, and
    F) a hot water line adapted to return hot water exiting the vapor separator to the coolant circulation pump, and
    G) a plurality of ports drilled and tapped in the at least one engine head with each port fitted with a coolant supply nozzle arranged to provide specific directional flow of high velocity cooling fluid for impinging high heat flux surfaces inside the engine head so as to maintain nucleate boiling conditions throughout the engine and
    H) a head gasket positioned between the at least one head and the engine block so that cooling port openings between the at least one engine head and the engine block are sealed except head exit ports located so as to create a passage for partially saturate liquid cooling fluids flowing across the head and into the engine block.

2. The system as in claim 1 and further comprising condensate components comprising:
    A) an excess vapor condensate tank adapted to condense excess vapor not needed by the hot vapor load,
    B) a condensate return tank adapted to store condensate from the hot vapor load and the excess steam condenser, and
    C) a condensate return line adapted to return condensate to the coolant recirculation pump.

3. The system as in claim 2 and further comprising a computer driven control system comprising a computer processor, at least one temperature sensor an at least one flow meter adapted to provide automatic control of the system to maintain desired nucleate boiling in the engine.

4. The system as in claim 1 wherein sealant cooling fluid exiting the engine is saturated with a quality of between 2 and 30 percent.

5. The system as in claim 1 wherein at least 10 percent of the cooling fluid exits the engine in a vapor phase.

6. The system as in claim 1 wherein at least 90 percent of the cooling fluid is water.

7. The system as in claim 1 wherein the engine is driven by natural gas.

8. A cogeneration process for generating electricity and hot vapor comprising the steps of:
    A) providing a cogeneration system for generating electricity and process steam comprising:
        1) an internal combustion engine having a shaft and a cooling system comprising a cooling fluid adapted to circulate through the engine and to cool the engine under conditions of nucleate boiling in which apportion of the cooling fluid exits the engine in a vapor phase,
        2) a vapor separator adapted to separate the cooling fluid that exits the engine into a vapor phase coolant and a liquid phase coolant,
        3) an electric generator driven by the engine shaft,
        4) a hot vapor line adapted to direct hot vapor exiting the vapor separator to a hot vapor load,
        5) a coolant circulation pump adapted to force the cooling fluid through the engine, and
        6) a hot water line adapted to return hot water exiting the vapor separator to the coolant circulation pump,
        7) a plurality of ports drilled and tapped in the at least one engine head with each port fitted with a coolant supply nozzle arranged to provide specific directional flow of high velocity cooling fluid for impinging high heat flux surfaces inside the engine head so as to maintain nucleate boiling conditions throughout the engine and
        8) a head gasket positioned between the at least one head and the engine block so that cooling port openings between the at least one engine head and the engine block are sealed except head exit ports located so as to create a passage for partially saturate liquid cooling fluids flowing across the head and into the engine block,
    B) operating the system to produce electricity and hot vapor for an industrial, commercial or residential process.

9. The process as in claim 8 wherein the process in an industrial process.

10. The process as in claim 8 wherein the process in a commercial process.

11. The process as in claim 8 wherein the process in a residential process.

12. The process as in claim 8 wherein the process in a industrial process.

13. The process as in claim 8 wherein the electricity is utilized to provide power in an electrical grid.

14. The process as in claim 8 wherein the electricity is utilized to provide baseload in an electrical grid.

15. The process as in claim 8 wherein the engine is driven by natural gas.

16. The process as in claim 8 wherein the engine is driven by a fuel chosen from the following group of fuels: natural gas, diesel fuel and gasoline.

* * * * *